United States Patent [19]

Tomotake

[11] Patent Number: 5,617,564
[45] Date of Patent: Apr. 1, 1997

[54] PROGRAM SOURCE FILE PREPROCESSING METHOD AND APPARATUS TO DETECT MODIFICATIONS AND GENERATE A CLASS OF FILES

[75] Inventor: Kazunori Tomotake, Katano, Japan

[73] Assignee: Matsushita Electric Industrial Co., Ltd., Osaka-fu, Japan

[21] Appl. No.: 228,904

[22] Filed: Apr. 18, 1994

[30] Foreign Application Priority Data

Apr. 20, 1993 [JP] Japan ................................ 5-092787

[51] Int. Cl.⁶ .................................................. G06F 17/30
[52] U.S. Cl. ........................ 395/611; 364/DIG. 7; 364/222.82; 395/616
[58] Field of Search ............................ 395/600, 700

[56] References Cited

U.S. PATENT DOCUMENTS

| | | | |
|---|---|---|---|
| 4,524,427 | 6/1985 | Vidalin et al. | 395/600 |
| 5,230,050 | 7/1993 | Iitsuka et al. | 395/700 |
| 5,278,979 | 1/1994 | Foster et al. | 395/600 |
| 5,404,525 | 4/1995 | Endicott et al. | 395/700 |
| 5,426,782 | 6/1995 | Shiga | 395/600 |

OTHER PUBLICATIONS

Harrison et al., "Attaching Instance Variables to Method Realizations Instead of Classes", IEEE, Jun. 1992, pp. 291–299.

D'Andrea et al., "Object–Oriented Programming Concepts and Languages", IEEE, Jan. 1990, pp. 634–640.

"The UNIX Programming Enviornment" by B.W. Kerighan and R. Pike; Prentice Hall, Inc., Englewood Cliffs, New Jersey (1984).

"SunOS Reference Manual (Sun Release 4.1)", Sun Microsystems (1989).

"Object Oriented Programming" by S. Hironori and H. Hitoshi, published by Ohm–sha., no date.

Primary Examiner—Thomas G. Black
Assistant Examiner—John C. Loomis
Attorney, Agent, or Firm—Greenblum & Bernstein P.L.C.

[57] ABSTRACT

A data processing method and apparatus are disclosed in which the class definition is first read from the class definition file to generate the structure and procedure definitions in memory. The pre-existence of a file storing the structure definition is then determined. If the file already exists, the structure definition in the memory is compared with the structure definition previously stored to the file to determine whether there is a meaningful difference between the two. If the file does not exist, or if there is a meaningful difference, the structure definition in memory is written to a newly created file or to the existing file. This same operation is executed for the procedure definitions.

6 Claims, 6 Drawing Sheets

PROGRAM SOURCE FILE PREPROCESSING METHOD AND APPARATUS TO DETECT MODIFICATIONS AND GENERATE A CLASS OF FILES

BACKGROUND OF THE INVENTION

1. Field of the invention

The present invention relates to a method and an apparatus for processing data on a computer, and particularly to a program translation method and apparatus therefor, and to a preprocessor method and apparatus for programs written in an object-oriented programing language.

2. Description of the prior art

Conventional computer-based data processing is executed by reading data from a file and then writing the resulting data to another file. More particularly, translation programs such as done in preprocessor and compiler are often run on computers through the step of reading the source program, i.e., the source data, from a source file, and writing the object file, i.e., the result data, to plural result files. A specific example of this data processing method is described below with reference to the figures.

Figure 7:
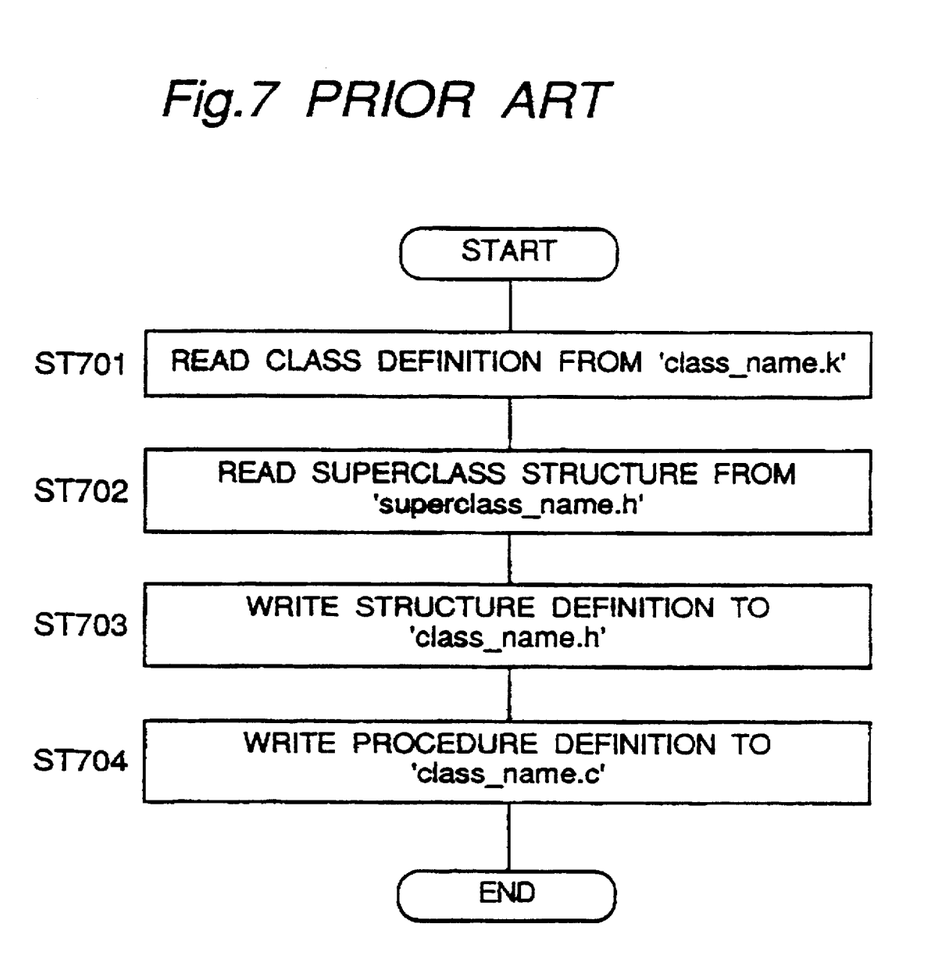
FIG. 7 is a flow chart of the overall operation of a preprocessor system according to the prior art.

FIG. 7 is a flow chart showing the operation of a preprocessing system of an object-oriented programming language based on the programming language C in a conventional preprocessing-type processing method. For a thorough discussion of object-oriented languages, see, for example, *An introduction to object oriented programming*, Sakai Hironori, Horiuchi Hitoshi, published by Ohm-sha (in Japanese).

This preprocessing system translates the class definition written in an object-oriented language to a C source program, and then processes this C source program using a C compiler to produce an object (machine language program).

When this preprocessor system is started by specifying the class name, the class definition is read from the file 'class_name.k' (ST701).

If a superclass is specified in this class definition, the superclass structure definition is read from the file 'superclass_name.h' (ST702). Here, the term superclass is used to indicate a class which is in a higher position. For example, in FIG. 5, class A is a superclass to class B or C, because it is necessary to use data in class A, i.e. A.h 504, to make data, i.e., B.h or C.h, in class B or C. The file 'superclass_name.h' must previously be generated by preprocessing the superclass. In the example shown in FIG. 5, the file 'A.h' must first be generated by preprocessing the class A.

This class is written to the file 'class_name.h' of which the structure definition is written in C source (ST703). At the same time, the procedure definitions written in C source are written to the file 'class_name.c' for this class (ST704).

With this conventional method, however, the results are always written to the file even when there is no difference between the results previously written to the file and the current results to be written to the file, and the file is therefore always updated. As a result, the file modification date and time are updated to the current (latest) date and time.

Problems arise, however, when software (e.g., the 'make' command in the UNIX operating system) controlling a sequence of operations on plural files dependent upon the file modification date/time and individual file dependencies is used to control the overall data process flow. This problem specifically is that even when there is no difference between the current and previous results, files dependent on the updated file are also processed, files dependent on those files are also updated, and this process continues until all files have been processed. For more information on the UNIX 'make' command, see *UNIX programming environment*, B. W. Kernighan, et al., Bell Laboratories, published by Prenticehall, Inc. Englewood Cliffs N.J. 07632. The "make" execution is disclosed in detail in "*SunOS Reference Manual* (Sun Release 4.1)" released Sep. 15, 1989 by sun microsystems.

This problem is further described using the preprocessor system in the processing system of the above preprocess method.

In programming with object-oriented languages, software being developed is programmed by programming plural classes. The class definitions (source programs) are stored to separate files, each of which is translated by the preprocessor system and compilers into objects (machine language programs), which are then edited by a linker generate a single executable program. Many files are associated with this process. In the UNIX environment, the 'make' command is used to sequentially run the preprocessor system, compiler, and other software components.

The overall process applying this conventional preprocessor system to the development of a specific class structure program is described below.

Figure 4:
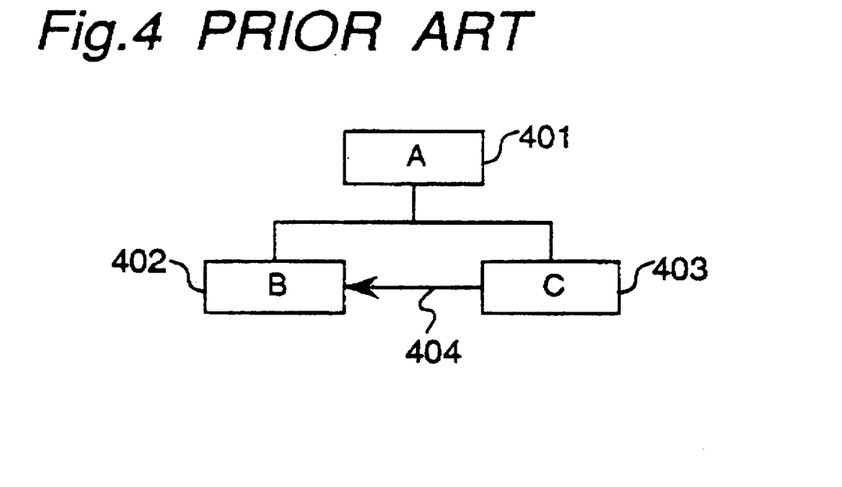
FIG. 4 shows the specific class hierarchy of a program processed by the preprocessor system of the prior art.

FIG. 4 shows the class hierarchy of the program being developed. Using the inheritance faculty of object-oriented languages, classes B 402 and C 403 are defined as subclasses of class A 401. The arrow 404 indicates that class C 403 references class B 402. In general, the overall process of an object-oriented language program is defined by the different classes referencing each other.

Figure 5:
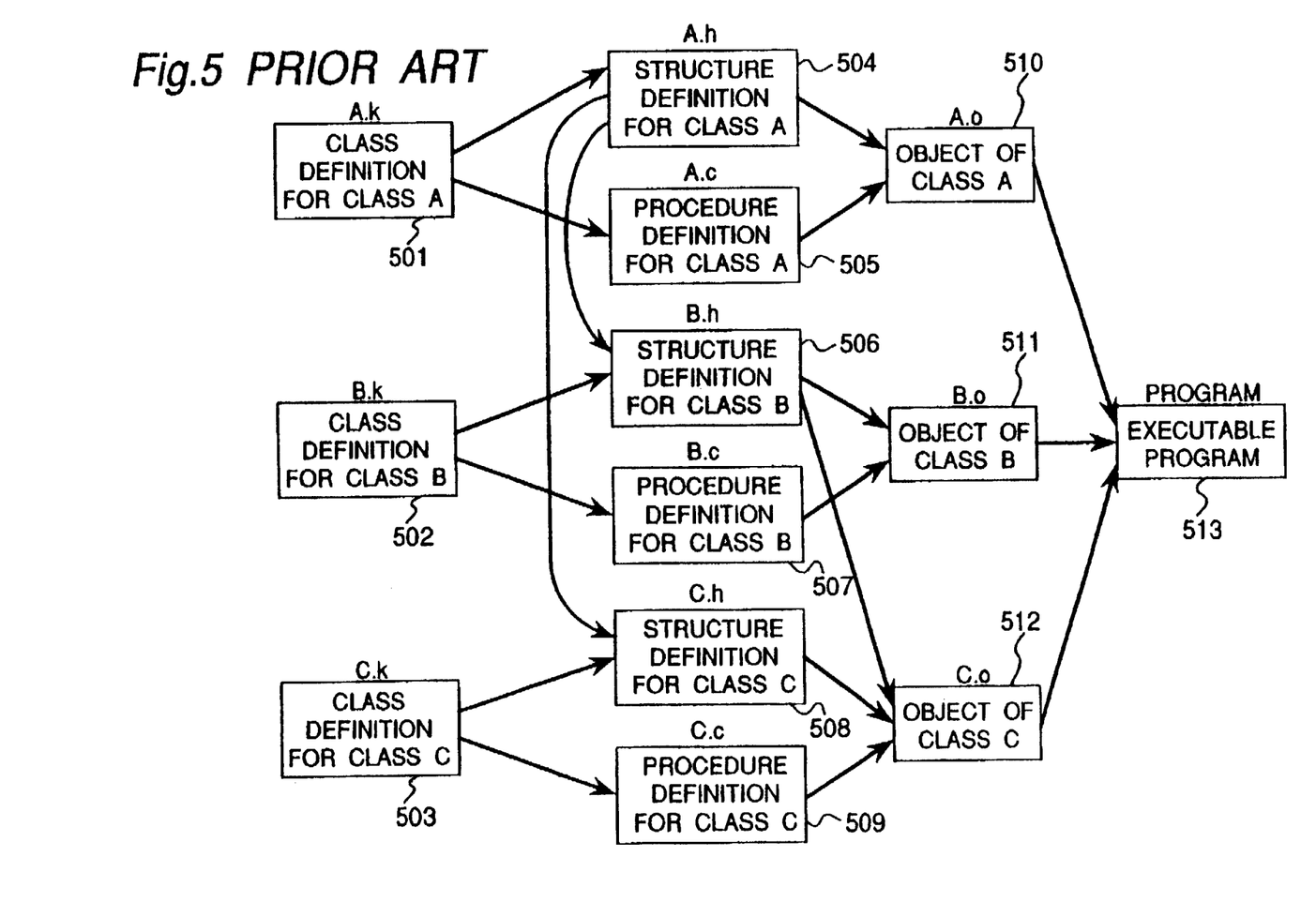
FIG. 5 shows the class definition files of the classes shown in FIG. 4 and their relationship to the files generated therefrom.

FIG. 5 shows the relationships between the various files generated from the original class definitions through the process obtaining the final object file, i.e., the executable program. The result data stored to the destination file (the file pointed to by each arrow) is generated based on the source data stored in the root file (or files) of each arrow. This indicates that, conversely, each destination file is also dependent on the root file(s), and FIG. 5 therefore also shows the dependency relationship of the various files.

Figure 6:
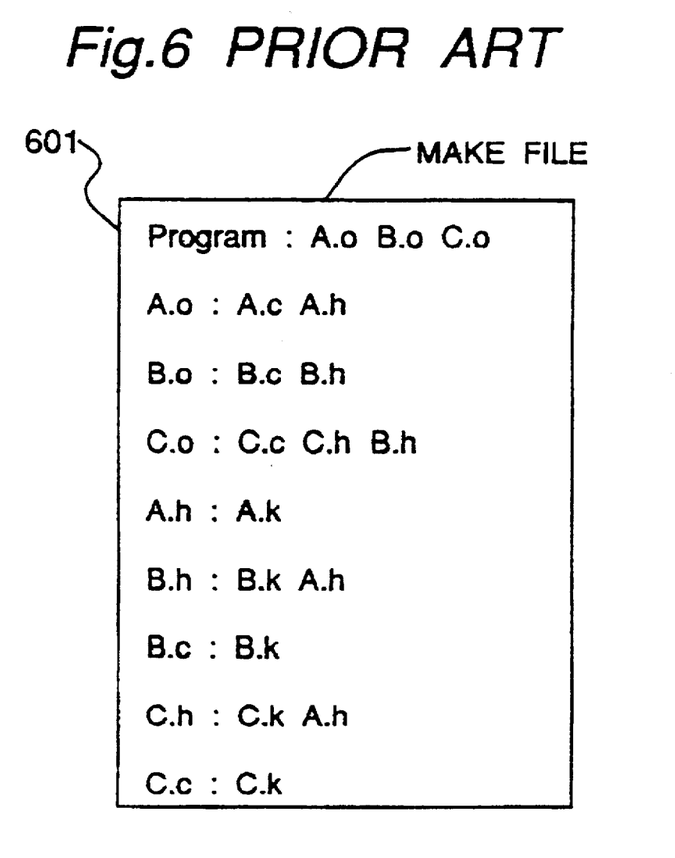
FIG. 6 is a text file describing the dependency of the generated files to the class definition files of the classes shown in FIG. 4.

The text 601 shown in FIG. 6 is a text file showing the same dependency relationship shown in FIG. 5. This file is referenced by the UNIX 'make' command; the colon (:) in each line indicates that the file preceding the colon is dependent upon the file(s) following the colon.

The process of generating the files as shown in FIGS. 5 and 6 is described further below.

The preprocessor first generates the structure definition file A.h 504 and procedure definition file A.c 505 using the class A class definition file A.k 501.

Then, for class B, using the class B class definition file B.k 502 and the structure definition file A.h 504, class B structure definition file B.h 506 is generated. Also, using the class B definition file B.k 502 procedure definition file B.c 507 is generated. In a similar manner, for class C, class C structure definition file C.h 508 and class C procedure definition file C.c 509 are generated.

As apparent from the above, class A preprocessing must be completed before preprocessing classes B and C.

The class A procedure definition file A.c 505 is then compiled by a C compiler to generate the class A abject file A.o 510. Note that the class A structure definition file A.h 504 is also read during compilation as an included file. A similar procedure is executed to compile the class B procedure definition file B.c 507 and generate the class B object file B.o 511; the class B structure definition file B.h 506 is similarly read as an included file during compilation. The class C procedure definition file C.c 509 is then compiled to generate the class C objecz file C.o 512. At this time, however, both the class C structure definition file C.h 508 and the referenced class B structure definition file B.h 506 are read as included files.

The resulting object files A.o 510, B.o 511, and C.o 512 are then joined by the linker to generate the final executable file program 513.

If the class A, B, and C class definitions are thus defined and the 'make' command is executed, the preprocessor system, compiler, and linker will be sequentially run based on the file dependency defined in text 601 (FIG. 6) to produce all of the above files.

The updated files and the process executed are described below when only the procedures in the class definition of class A are modified and the 'make' command is re-executed to generate the various files. It should be noted before the following description that file generation in the initial 'make' command call is no problem because all files must necessarily be generated the first time the 'make' command is run.

It is assumed that the class A class definition file A.k 501 has been so modified as to make a change in the class A procedure definition file A.c 505, but no change in the class A structure definition file A.h 504. First, the preprocessor is run to process the modified class definition file A.k 501 so as to update the structure and procedure definition files A.h 504 and A.c 505. In this case, there will be no actual change in the structure definition file A.h 504. Even though the class structure is not modified in the class definition file A.h 504, the preprocessor system will also update both files A.h 504 and A.c 505 based on steps ST703 and ST704 in the FIG. 7 flow chart. Since there is no substantial change in the structure definition file A.h 504 in step ST703, the processing in step ST703 would be a waist of time.

Furthermore, the preprocessor system further carries out unnecessaryupdating steps: such as updating the two files B.h 506 and C.h 508, and for accomplishing the updating of the two files B.h 506 and C.h 508, the class definition files B.k 502 and C.k 503 are processed. Also, files B.h 506, B.c 507, C.h 508, and C.c 509 are unnecessarily updated.

In other words, even with such a minor modification as explained in the above assumption, the preprocessor system is run sequentially three times (A.k→A.h and A.c; B.k→B.h and B.c; and C.k→C.h and c.c) according to this file dependency relationship, and the three class object files A.o 510, B.o 511, and C.O 512 are all updated. The linker is then run to update the program 513. As a result, a total of seven processes (A.k→A.h and A.c; B.k→B.h and S.c; C.k→C.h and C.c; A.h and A.c→A.o; B.h and B.c→B.o; C.h and C.c→C.o; and A.o, B.o and C.o→Program) in the preprocessing, compiling, and linking sequence are required to update the program 513.

As is obvious from the above description, the structure definition file A.h 504 is updated in this method even though there is no change in the class A structure definition. This causes the files dependent on this file to also be processed, thus increasing the overall processing time.

SUMMARY OF THE INVENTION

Therefore, an object of the present invention is to provide a data processing method in which unnecessary processing of unmodified files is not executed when using software that controls the processing of plural related files based on file dependency and file modification dates/times.

To achieve this object, according to the present invention, a data processing method for processing a high precedence file to generate a low precedence file, comprises the steps of:

(a) reading said high precedence file to generate data for the low precedence file;

(b) storing said generated data temporarily in a memory means, such as in a disk;

(c) detecting whether or not the low precedence file is existing in said memory means;

(d) creating, when no low precedence file is existing, a new low precedence file, and writing the temporarily stored data in said new low precedence file;

(e) comparing, when said low precedence file is existing, said temporarily stored data with old data already written in said low precedence file; and (f) rewriting said temporarily stored data in said low precedence file when a meaningful difference is detected during the comparison.

According to the preferred embodiment of the present invention, the data processing method for use in an object-oriented preprocessing system for processing a high precedence file, which is a class definition file, to generate a low precedence structure definition file and a low precedence procedure definition file, comprises the steps of:

(a) reading said high precedence file to generate structure definition data and procedure definition data for said low precedence structure definition file and said low precedence procedure definition file, respectively;

(b) storing said generated structure definition data and procedure definition data temporarily in a memory means;

(c) detecting whether or not the low precedence structure definition file is existing in said memory means;

(d) creating, when no low precedence structure definition file is existing, a new low precedence structure definition file, and writing the temporarily stored structure definition data in said new low precedence structure definition file;

(e) comparing, when said low precedence structure definition file is existing, said temporarily stored structure definition data with old structure definition data already written in said low precedence structure definition file;

(f) rewriting said temporarily stored structure definition data in said low precedence structure definition file when a meaningful difference is detected during the comparison;

(g) detecting whether or not the low precedence procedure definition file is existing in said memory means;

(h) creating, when no low precedence procedure definition file is existing, a new low precedence procedure definition file, and writing the temporarily stored procedure definition data in said new low precedence procedure definition file;

(i) comparing, when said low precedence procedure definition file is existing, said temporarily stored procedure definition data with old procedure definition data already written in said low precedence procedure definition file; and (j) creating said temporarily stored procedure definition data in said low precedence procedure definition file when a meaningful difference is detected during the comparison.

By means of this data processing method, the results of file processing are compared with the previous results, and the result file is not updated when there is no change in the result file contents. As a result, files dependent upon unmodified files are not processed in the updating process.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
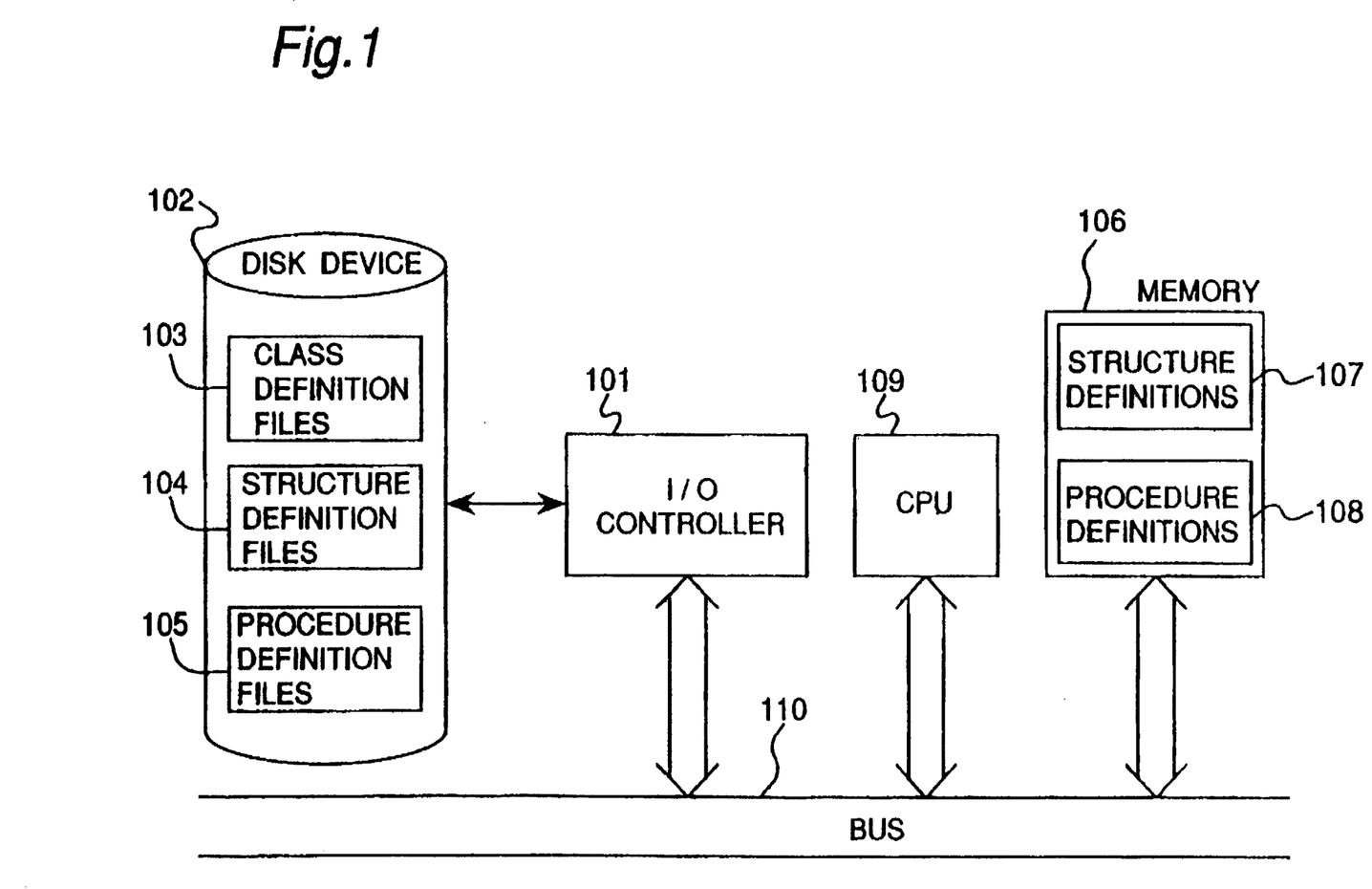
FIG. 1 is a structural diagram of a preprocessor system according to the preferred embodiment of the invention.

The preferred embodiments of the invention are described below with reference to the accompanying figures, of which FIG. 1 is a structural diagram of the data processing system of the invention, specifically a preprocessor system of a preprocessor-type object-oriented language based on the C language.

Referring to FIG. 1, the I/O controller 101 controls the disk drive 102, which is the filing means snoring the class definition files 103, structure definition files 104, and the procedure definition files 105. As described above, the class definition files 103 are the source files storing the class definitions, which are the source dana; the structure definition files 104 are the result files storing the structure definitions, which are one type of result data; and the procedure definition files 105 are the result files storing the procedure definitions, which are another type of result data. The memory 106 is a storage means holding the structure definitions 107 and the procedure definitions 108, which are the two result data types. The I/O controller 101 and memory 106 are controlled by the CPU 109, which is the operating means, by means of a bus 110.

The overall operation of this embodiment is described below with reference to the flow chart in FIG. 2.

When this preprocessor system is started by specifying the class name, the class definitions are read from the class definition file 103 of filename 'class_name.k' (ST201).

If a superclass is specified in this class definition, the superclass structure definition is read from the file 'superclass_name.h' (ST202). Note that the file 'superclass_ name.h' must previously be generated by the preprocessor system processing the superclass. Also, in the case where there is no dependency with the superclass structure definition file, such as for generating a structure definition file A.h 504 in FIG. 5, step ST202 is skipped. However, in the case where there is a dependency with the superclass structure definition file, such as for generating a structure definition file B.h 506 in FIG. 5, step ST202 is carried out to read the file 'superclass_name.h' (i.e., A.h).

From the class definition, the structure definition 107 written in C and the procedure definition 108, also written in C, are generated in memory 106 (ST203).

It is then determined whether the file storing the structure definition 107 i.e., a file of filename 'class_name.h,' already exists in the structure definition files 104 (ST204).

If the file exists, the structure definition 107 in memory is compared with the previous structure definition already stored in the structure definition file 104 to determine whether there is a meaningful difference (ST205).

If the structure definition file 104 does not exist (ST204) or if there is a meaningful difference (ST205), the structure definition 107 held in memory is written to the structure definition file 104 (ST206).

The same procedure is then executed for the procedure definition: the presence of a file storing the procedure definition 108, i.e., a procedure definition file 105 of filename 'class_name.c,' is determined (ST207).

If the file exists, the procedure definition 108 in memory is compared with the previous procedure definition already stored in the procedure definition file 105 to determine whether there is a meaningful difference (ST208).

If the procedure definition file 105 does not exist (ST207) or if there is a meaningful difference (ST208), the procedure definition 108 held in memory is written to the procedure definition file 105 (ST209).

Figure 2:
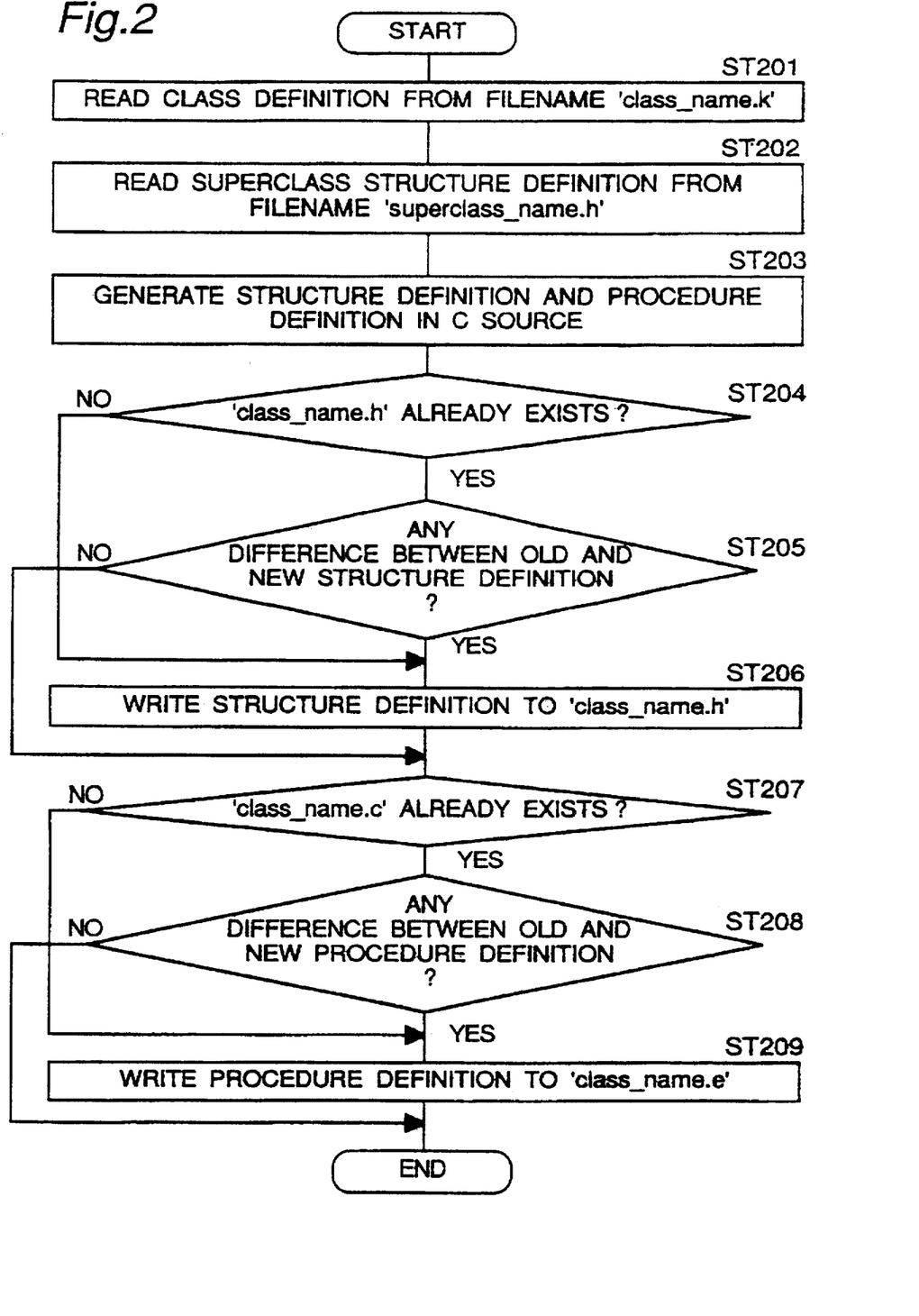
FIG. 2 is a flow chart of the overall operation of the preprocessor system of the invention.

While this accurately describes the overall process, the process of comparing the current results with the previous (stored) results in steps 204 and 207 of FIG. 2 is described in greater detail below with reference to the flow chart in FIG. 3a.

Figure 3A:
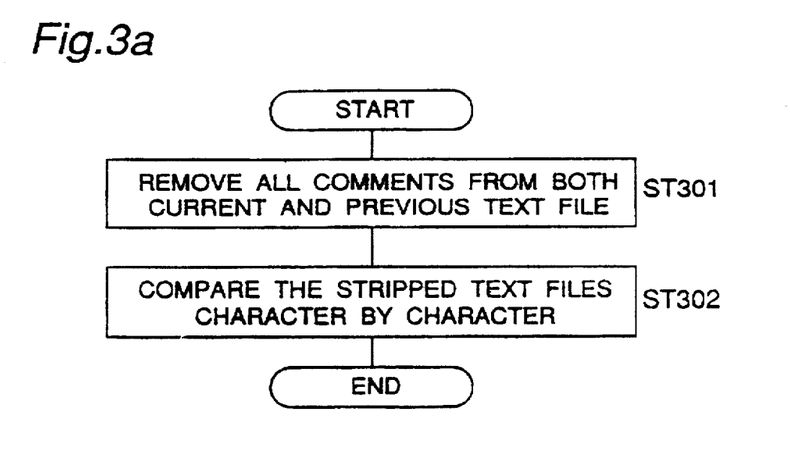
FIG. 3a is a flow chart of the result data comparison method in the preprocessor system of the preferred embodiment.

As shown in FIG. 3a, a difference comparison canbe accomplished by a text comparison because the preprocessor system of this embodiment generates a C source file. The first step is therefore to remove all comments, such as a version number of the preprocessor system incorporated by the system, from the current result data stored in memory and the previous result data written to the file (ST301). The result data can be a text data written in ASCII or a picture data. Once the comments have been removed, the remaining text files are compared character by character from the beginning of the files (ST302). If any one character differs between the two result data files, a meaningful difference is confirmed; if all characters are equal, there is no difference.

Figure 3B:
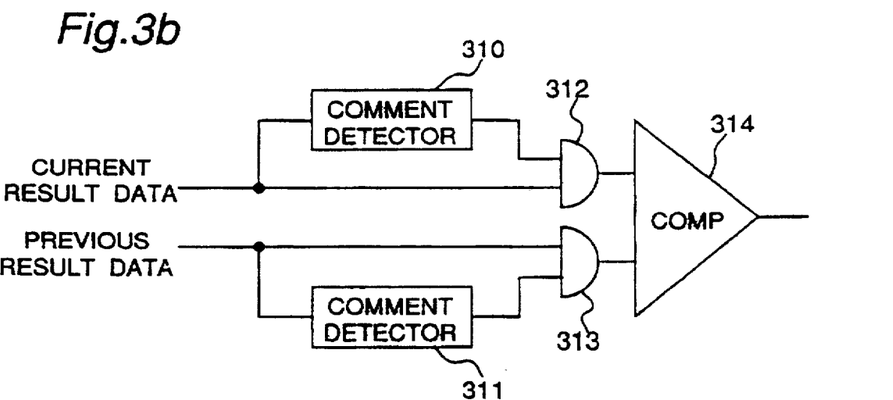
FIG. 3b is a circuit diagram showing a difference comparison device for effecting the flow chart of FIG. 3a, FIG. 3c is a diagram showing data alignment before the comparison.
Figure 3C:
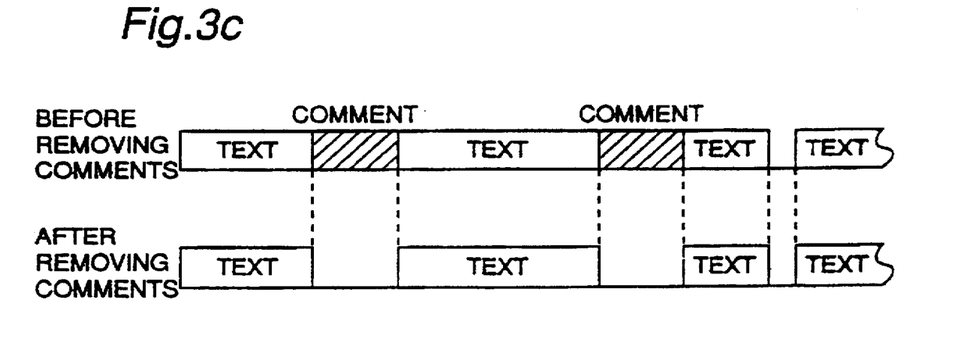

Referring to FIG. 3b, a circuit diagram of a difference comparison device is shown. The difference comparison device has comment detectors 310 and 311, AND gates 312 and 313 and a comparator 314. The current result data is applied directly to one input of the AND gate 312 and also through comment detector 310 to the other input of the AND gate 312. Similarly, the previous result data is applied, directly to one input of the AND gate 313 and also through comment detector 311 to the other input of the AND gate 313. When the comment detectors 310 and 311 detects comments, a LOW level signal is produced to disable theE gates 312 and 313, respectively. Thus, AND gates produces only the text data, as shown in the second row in FIG. 3c, in which the first row shows data alignment before removing the comments. Then, comparator 314 compares the current and previous result data with the comments removed. If a difference is detected between two inputs to the comparator 314, a HIGH level signal is produced to indicate that the meaningful difference exist between the current and previous result data.

The savings obtained in overall processing time by applying the preprocessor system of this embodiment to the development of software with a specific class structure using software (e.g., the 'make' command in the UNIX operating system) for controlling a sequence of operations on plural files dependent upon the file modification date/time and individual file dependencies is used to control the overall data process flow are described below. The same class structure and figures used in the description of the prior art above are used below.

For reference, these figures are briefly described again. FIG. 4 shows the class hierarchy of the program being developed. FIG. 5 shows the relationships between the various files generated from the original class definitions through the process obtaining the final object file, i.e., the executable program. The text 601 shown in FIG. 6 is a text file showing the same file dependency relationship shown in FIG. 5. This file is referenced by the UNIX 'make' command.

If the class A, B, and C class definitions are thus defined and the 'make' command is executed, the preprocessor system, compiler, and linker will be sequentially run based on the file dependency defined in text 601 (FIG. 6) to generate all of the files shown in FIG. 5.

The updated files and the process executed are described below when only the procedures, and not the structure, in the class definition of class A are modified and the 'make' command is re-executed to generate the various files. It should be noted that, as in the prior art above, file generation in the initial 'make' command call is no problem because all files must necessarily be generated the first time the 'make' command is run.

Because the class A class definition file A.k 501 has been modified, the preprocessor system of the invention is run to update the structure and procedure definition files A.h 504 and A.c 505 dependent on the modified class A definition file A.k 501. As a result, the preprocessor system reads the class definitions from the class definition file A.k 501 (corresponding to the class definition file 103 in FIG. 1) (ST201). Because there is no superclass for class A, nothing is read at ST202. As a result, the structure definition 107 and procedure definition 108 are generated in memory 106 from the class definition (ST203).

It is then determined whether a file storing this structure definition 107, i.e., a structure definition file 504 of filename A.h (corresponding to the structure definition file 104 in FIG. 1), already exists in the structure definition files 104 (ST204). Because the file does exist in this case, the structure definition 107 in memory is compared with the previous structure definition stored in the structure definition file A.h 504 (104 in FIG. 1), and the structure definitions are compared for any meaningful differences (ST205). Because the structure of the class definition has not changed in this example, 'no difference' is returned by step ST205. As a result, step ST206 for writing the structure definition 107 in memory to the structure definition file A.h 504 (104 in FIG. 1) is not executed.

The next step is determining whether the procedure definition file storing the procedure definition 108, i.e., procedure definition file A.c 505 (105 in FIG. 1), already exists (ST207). Because it does in this case, the procedure definition 108 in memory is compared with the previous procedure definition snored in the procedure definition file A.c 505 (105 in FIG. 1), and the procedure definitions are compared for any meaningful differences (ST208). Step ST207 returns 'changed' in this example because the procedures in the class definition have been changed. As a result, the procedure definition 108 in memory is written to the procedure definition file A.c 505 (105 in FIG. 1) (ST209).

As a result, only the procedure definition file A.c 505 (105 in FIG. 1) is updated, and the structure definition file A.h 504 (104 in FIG. 1) is not updated.

The C compiler is then run to update the class A object file of filename A.o 510 because the object file is dependent upon the modified procedure definition file A.c 505 updated by the preprocessor system. The linker is then run to update the final object file of filename 'Program' 513 because this is dependent upon the updated class A object file 510.

As a result, the completed executable program 513 can be obtained with just three processes using the preprocessor, compiler, and linker. This is significantly more efficient than the seven operations required by the prior art.

Note that while the above embodiment has been described as a preprocessor system for a preprocessing-type object-oriented language based on the C language, the invention shall not be so limited and can be applied with computer languages other than C.

In addition, the invention shall not be limited to use with the preprocessor systems of object-oriented languages, and can also be applied in the translation methods of conventional computer programs.

Memory is also used in the above embodiment for result data storage, but the same effect can be obtained by using temporary files stored elsewhere.

The same effect can also be obtained by using a detailed comparison method including word analysis as the result comparison method shown in the FIG. 3 flow chart.

By means of the simple process of writing the result data to the result file only when there is a change in the result data, the present invention can reduce the number of file write operations and prevent changing the modification date/time of files for which there is no change in the result data. As a result, when software (e.g., the 'make' command in the UNIX operating system) controlling a sequence of operations on plural files dependent upon the file modification date/time and individual file dependencies is used to control the overall data process flow, processing of files dependent on files in which there is no change of content even though the modification date/time has changed can be eliminated, and the efficiency of the overall file processing operation can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A program source file preprocessing method for processing a high precedence file to generate a low precedence file, comprising the steps of:

(a) reading said high precedence file to generate data for the low precedence file;

(b) storing said generated data temporarily in memory means;

(c) detecting whether or not the low precedence file is existing in said memory means;

(d) creating, when no low precedence file is existing, a new low precedence file, and writing the temporarily stored data in said new low precedence file;

(e) comparing, when said low precedence file is existing, said temporarily stored data on a character-by-character basis with old data already written in said low precedence file; and (f) rewriting said temporarily stored data in said low precedence file when a meaningful difference is detected during the comparison.

2. A program source file preprocessing method for use in an object-oriented preprocessing system for processing a high precedence file, which is a class definition file, to generate a low precedence structure definition file and a low precedence procedure definition file, comprising the steps of:

(a) reading said high precedence file to generate structure definition data and procedure definition data for said low precedence structure definition file and said low precedence procedure definition file, respectively;

(b) storing said generated structure definition data and procedure definition data temporarily in memory means;

(c) detecting whether or not the low precedence structure definition file is existing in said memory means;

(d) creating, when no low precedence structure definition file is existing, a new low precedence structure definition file, and writing the temporarily stored structure definition data in said new low precedence structure definition file;

(e) comparing, when said low precedence structure definition file is existing, said temporarily stored structure definition data on a character-by-character basis with old structure definition data already written in said low precedence structure definition file; and (f) rewriting said temporarily stored structure definition data in said low precedence structure definition file when a meaningful difference is detected during the comparison;

(g) detecting whether or not the low precedence procedure definition file is existing in said memory means;

(h) creating, when no low precedence procedure definition file is existing, a new low precedence procedure definition file, and writing the temporarily stored procedure definition data in said new low precedence procedure definition file;

(I) comparing, when said low precedence procedure definition file is existing, said temporarily stored procedure definition data on a character-by-character basis with old procedure definition data already written in said low precedence procedure definition file; and (j) rewriting said temporarily stored procedure definition data in said low precedence procedure file when a meaningful difference is detected during the comparison.

3. A program source file preprocessing method as claimed in claim 2, wherein said reading step (a) comprises the step of:

(a') reading a superclass structure definition file for use in generating said low precedence structure definition file.

4. A program source file preprocessing apparatus for processing a high precedence file to generate a low precedence file, comprising:

first memory means for storing said high precedence file;

a processing unit for reading said high precedence file and for generating data for the low precedence file;

second memory means for temporarily storing said generated data;

detecting means for detecting whether or not the low precedence file is existing in said second memory means;

creating means for creating, when no low precedence file is existing, a new low precedence file, and writing the temporarily stored data in said new low precedence file;

comparing means for comparing, when said low precedence file is existing, said temporarily stored data on a character-by-character basis with old data already written in said low precedence file; and rewriting means for rewriting said temporarily stored data in said low precedence file when a meaningful difference is detected during comparison.

5. A program source file preprocessing apparatus for processing a high precedence file to generate a low precedence structure definition file and a low precedence procedure definition file, comprising:

first memory means for storing said high precedence file;

a processing unit for reading said high precedence file to generate structure definition data and procedure definition data for said low precedence structure definition file and said low precedence procedure definition file, respectively;

second memory means for temporarily storing said generated structure definition data and procedure definition data;

first detecting means for detecting whether or not the low precedence structure definition file is existing in said second memory means;

first creating means for creating, when no low precedence structure definition file is existing, a new low precedence structure definition file, and writing the temporarily stored structure definition data in said new low precedence structure definition file;

first comparing means for comparing, when said low precedence structure definition file is existing, said temporarily stored structure definition data on a character-by-character basis with old structure definition data already written in said low precedence structure definition file;

first rewriting means for rewriting said temporarily stored structure definition data in said low precedence structure definition file when a meaningful difference is detected during comparison;

second detecting means for detecting whether or not the low precedence procedure definition file is existing in said second memory means;

second creating means for creating, when no low precedence procedure definition file is existing, a new low precedence procedure definition file, and writing the temporarily stored procedure definition data in said new low precedence procedure definition file; and second comparing means for comparing, when said low precedence procedure definition file is existing, said temporarily stored procedure definition data on a character-by-character basis with old procedure definition data already written in said low precedence procedure definition file;

second rewriting means for rewriting said temporarily stored procedure definition data in said low precedence procedure definition file when a meaningful difference is detected during comparison.

6. A program source file preprocessing apparatus as claimed in claim 5, wherein said processing unit comprises means for reading a superclass structure definition file for use in generating said low precedence structure definition file.

* * * * *